UNITED STATES PATENT OFFICE.

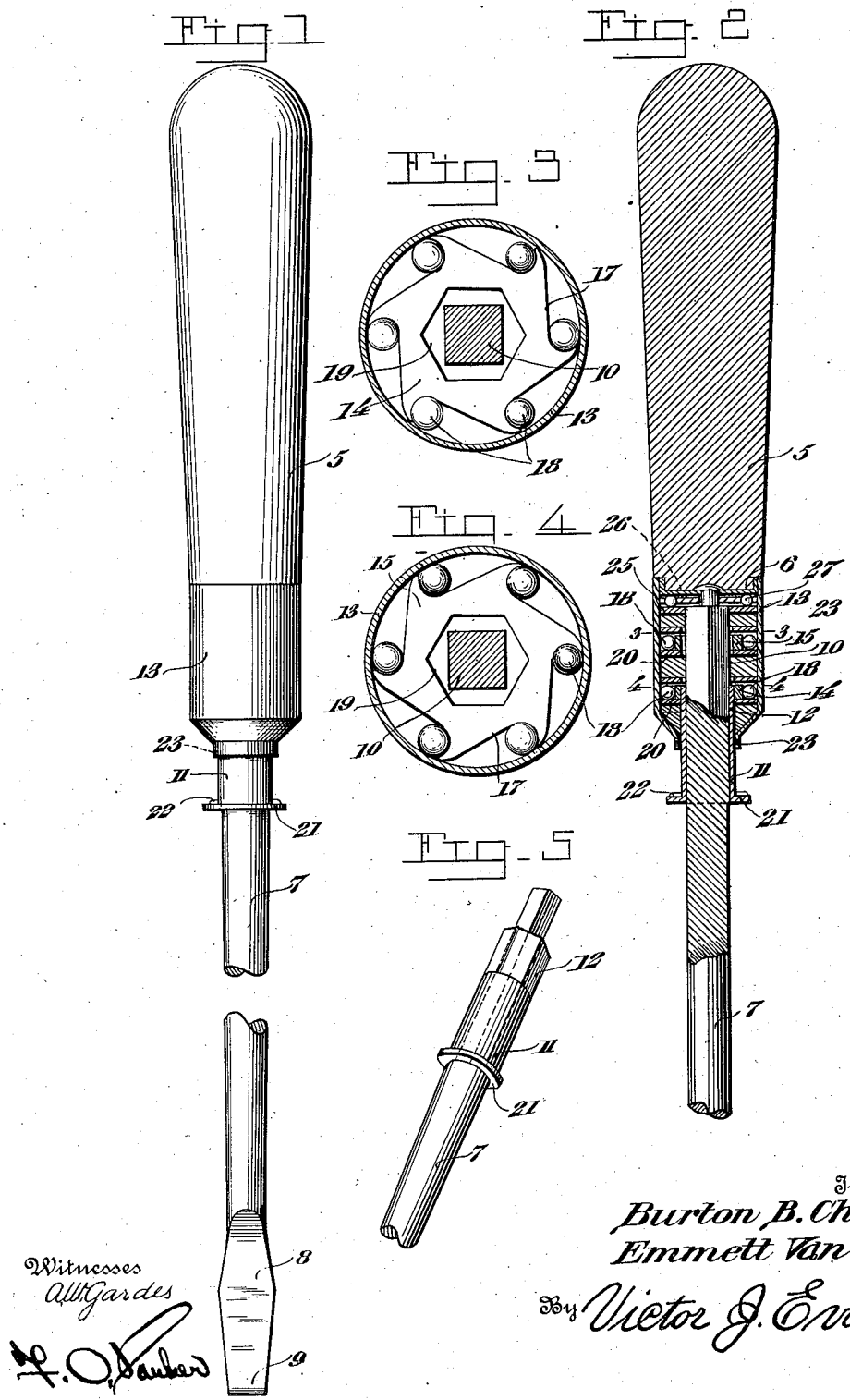

BURTON B. CHASE AND EMMETT VAN SICKLE, OF PORT JERVIS, NEW YORK, ASSIGNORS OF ONE-THIRD TO CHARLES N. KNAPP, OF PORT JERVIS, NEW YORK.

SCREW-DRIVER.

1,028,675.  Specification of Letters Patent.  Patented June 4, 1912.

Application filed July 11, 1911. Serial No. 637,892.

*To all whom it may concern:*

Be it known that we, BURTON B. CHASE and EMMETT VAN SICKLE, citizens of the United States, residing at Port Jervis, in the county of Orange and State of New York, have invented new and useful Improvements in Screw-Drivers, of which the following is a specification.

The invention relates to screw drivers, and more particularly to the class of ball ratchet head screw drivers.

The primary object of the invention is the provision of a screw driver in which the shank thereof may be locked in the ratchet head when turned in one direction, but on the reverse turning of the head, the shank will be unlocked from the head, thus permitting the free rotation of the latter.

Another object of the invention is the provision of a screw driver in which the shank thereof may be locked in the ball ratchet head, whereby it may be turned in reverse directions at will, thereby enabling the screw driver to be used in contracted places.

A further object of the invention is the provision of a screw driver in which the handle portion thereof is connected with the shank, so that it may freely rotate in either direction on the shank, without turning the same, or the shank may be locked with the handle, so that both may be turned together.

A still further object of the invention is the provision of a screw driver which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a screw driver constructed in accordance with the invention. Fig. 2 is a vertical longitudinal sectional view thereof.
Fig. 3 is a sectional view on the line 3—3 of Fig. 2. Fig. 4 is a sectional view on the line 4—4 of Fig. 2. Fig. 5 is a fragmentary perspective view of the screw driver shank and the ratchet controlled slide mounted thereon.

Similar reference characters indicate corresponding parts throughout the several views of the drawings.

Referring to the drawings by numerals, the screw driver comprises a handle 5 which may be of any desirable length, and is formed with a contracted circular-shaped end 6, in which is suitably swiveled the inner end of a shank or stem 7, the outer end thereof being formed with opposite flattened beveled faces 8 forming a tapered pointed edge 9 for engagement in the grooved head of a screw (not shown) of the ordinary well-known construction. This shank or stem 7, at its inner end, is formed with a squared portion 10, surrounded by an adjustable sleeve 11 longitudinally slidable on the squared portion 10 of the shank or stem, the bore in the sleeve 11 being correspondingly squared with respect to the squared inner portion 10 of the said shank or stem, so as to rotate therewith, while the inner end of the said sleeve 11 is formed on its outer face with a hexagonal-shaped portion 12 for alternate locking engagement with ratchet members, presently described.

Surrounding the sleeve 11 and fixed to the reduced end 6 of the handle 5 is a ferrule 13, in which are loosely mounted inner and outer ratchet members or disks 14 and 15, respectively. In the periphery of the inner ratchet member or disk 14 are formed ball cam seats 16, while in the periphery of the outer ratchet member or disk 15 are formed ball cam seats 17, reversely disposed with respect to the seats 16 in the inner ratchet member or disk, the seats 16 and 17 being adapted to receive bearing balls 18. The innermost or main portions of the seats 16 and 17 are of the same diameter as the bearing balls 18, and are so located that when the balls 18 are mounted therein, the said balls will just clear or barely engage the inner surface of the ferrule 13, whereby the latter will be free to rotate independently of the inner and outer ratchet members or disks.

The seats 16 and 17 taper outwardly from their deeper portions to the periphery of the ratchet members or disks, so that on movement of the members or disks in one direction, the balls 18 will be wedged in the seats 16 and 17 between the said members or disks and the ferrule for the locking of the same together. However, it is to be understood that by reason of the reverse disposition of the seats 16 and 17 with respect to each other, on the movement of the inner member or disk 14 in one direction, it will be locked with the ferrule 13 independently of the outer member or disk 15, and upon the movement of the said member or disk 15 in the reverse direction, it will be locked with the said ferrule 13 independently of the inner member or disk 14. The inner and outer members 14 and 15 are independently locked to the shank or stem 7, in a manner presently described.

The inner and outer ratchet members or disks 14 and 15 are arranged concentrically about the squared portion 10 of the shank 7 and the sleeve 11 and are spaced from the former, and these ratchet members are provided with central hexagonal-shaped openings 19 of a corresponding size with respect to the hexagonal-shaped portion of the said sleeve 11, so that upon adjustment of the latter, the said hexagonal-shaped portion 12 thereof may be brought into position for engagement in either of the central openings 19 in the ratchet members or disks 14 and 15, respectively, thereby locking the same with the stem or shank 7 for the turning thereof in reverse direction.

The inner and outer ratchet members 14 and 15 are spaced apart by means of a spacing washer 20 interposed therebetween and confined within the ferrule 13, so that the said members or disks will not interfere with each other in their independent movements in the operation of the screw driver.

Formed on the outer end of the adjustable sleeve 11 is an outturned annular flange 21 provided at diametrically opposite points with inwardly extending lugs 22, the same being adapted to engage in correspondingly-shaped notches 23 formed in an annular rim 24 on the outer end of the ferrule 13, the lugs 22 when engaged in the notches 23 being adapted to lock the stem or shank 7 with the ferrule 13, whereby the screw driver may be used in the ordinary well-known manner, and thereby preventing the handle 5 from turning independently of the stem or shank of the screw driver.

The inner ratchet member or disk 14 is held spaced from the inner end of the handle by means of a spacing washer 25, the same being interposed between said member or disk on the handle 5. The inner end of the handle 5 is formed with an annular raceway 26 concentrically with respect to the shank or stem 7, and in which are disposed a series of bearing balls 27, the latter being adapted to travel upon the washer 25, thereby reducing friction during the operation of the screw driver.

What is claimed is:

1. A screw driver comprising a handle, a shank rotatably connected therewith, a ferrule fixed to the handle and surrounding a portion of the shank, spaced inner and outer ratchet disks loosely surrounding the shank within the ferrule and provided with non-circular openings, said disks being provided with ball seats, locking bearing balls confined within the seats and adapted to engage the ferrule on reverse movements of the disks, and a slidable sleeve locking against rotation on the shank and having a non-circular portion adapted for alternate engagement with the non-circular openings of the ratchet disks to lock the same independently of each other on the shank.

2. A screw driver comprising a handle, a shank rotatably connected therewith, a ferrule fixed to the handle and surrounding a portion of the shank, spaced inner and outer ratchet disks loosely surrounding the shank within the ferrule and provided with non-circular openings, said disks being provided with ball seats, locking bearing balls confined within the seats and adapted to engage the ferrule on reverse movements of the disks, a slidable sleeve locked against rotation on the shank and having a non-circular portion adapted for alternate engagement with the non-circular openings of the ratchet disks to lock the same independently of each other on the shank, the said ferrule being provided with notches in its outer end, and lugs formed on the sleeve and engageable in the notches for locking the sleeve with the ferrule and simultaneously locking the shank with the sleeve.

3. A screw driver comprising a handle, a shank rotatably connected therewith, a ferrule fixed to the handle and surrounding a portion of the shank, ratchet mechanisms loosely surrounding the shank within the ferrule and provided with non-circular openings, and a slidable sleeve carried by the shank and locked against rotation thereon, said sleeve being provided with a non-circular portion adapted for alternate engagement with the non-circular openings of the ratchet mechanisms to lock the latter independently of each other on the shank.

In testimony whereof we affix our signatures in presence of two witnesses.

BURTON B. CHASE.
EMMETT VAN SICKLE.

Witnesses:
JAMES C. LAUER,
JENNIE VAN SICKLE.

Copies of this patent may be obtained for five cents each, by addressing the "Commissioner of Patents, Washington, D. C."